US005974576A

United States Patent [19]

Zhu

[11] Patent Number: 5,974,576

[45] Date of Patent: Oct. 26, 1999

[54] ON-LINE MEMORY MONITORING SYSTEM AND METHODS

[75] Inventor: Ji Zhu, Fremont, Calif.

[73] Assignee: Sun Microsystems, Inc., Mountain View, Calif.

[21] Appl. No.: 08/644,314

[22] Filed: May 10, 1996

[51] Int. Cl.[6] .......... G06F 11/00

[52] U.S. Cl. .......... 714/704; 714/718; 714/752; 714/753; 714/764

[58] Field of Search .......... 371/5.1, 37.2, 371/21.1, 21.2, 37.01, 37.7, 40.2; 714/704, 718, 752, 753, 764

[56] References Cited

U.S. PATENT DOCUMENTS

| | | | |
|---|---|---|---|
| 4,319,356 | 3/1982 | Kocol et al. | 371/38 |
| 4,347,600 | 8/1982 | Abbott et al. | 370/13 |
| 4,531,213 | 7/1985 | Scheuneman | 371/3 |
| 4,792,953 | 12/1988 | Pasdera et al. | 371/31 |
| 4,809,276 | 2/1989 | Lemay et al. | 371/38 |
| 5,263,032 | 11/1993 | Porter et al. | 371/40.2 |
| 5,502,732 | 3/1996 | Arroyo et al. | 371/30 |
| 5,604,753 | 2/1997 | Bauer et al. | 371/40.1 |

OTHER PUBLICATIONS

"Error Frequency Warning Detector on Storage with ECC", IBM Technical Disclosure Bulletin, vol. 12, No. 6, New York, NY, Nov. 1969, p. 895.

"Double Thresholding of Errors", IBM Technical Disclosure Bulletin, vol. 32, No. 10B, Mar. 1990, p. 117.

*Primary Examiner*—Phung M. Chung

*Attorney, Agent, or Firm*—Blakely Sokoloff Taylor & Zafman

[57] ABSTRACT

On-line memory monitoring system and methods wherein memory subsystem performance is tracked to detect substandard performance and alert a system administrator of the nature of the substandard performance so corrective action can be taken before a system crash and/or automatic reset occurs. A computer system incorporating the invention includes a memory and a processor, wherein the memory storage includes data storage and error correction code storage for each dataword. The system further includes automatic error detection and correction circuitry and software which monitors the occurrence of correction of errors and compares their frequency with the known frequency of soft errors for the memory devices being used to determine whether an alert is to be given and the nature of any such alert.

26 Claims, 3 Drawing Sheets

ON-LINE MEMORY MONITORING SYSTEM AND METHODS

BACKGROUND OF THE INVENTION

1. Field of the Invention

The present invention relates the field of computer memory systems and the performance thereof.

2. Prior Art

Most computer systems include, among other things, substantial storage capacity in the form of random access memory, currently most commonly in the form of dynamic random access memory (DRAM). Such memories and systems incorporating such memories are known to be subject to certain types of errors. For instance, in the memory itself, the errors may be generally classified as either soft errors or hard errors. Soft errors are errors which occasionally occur, but are not repeatable, at least on a regular basis. Thus, soft errors alter data, though the stored data may be corrected by rewriting the correct data to the same memory location. A major cause of soft errors in DRAMs are alpha particles which, because of the very small size of DRAM storage cells, can dislocate sufficient numbers of electrons forming the charge determining the state of the cell to result in the cell being read as being in the opposite state. This results in a relatively randomly occurring, single bit memory error which, because of its very low likelihood of reoccurrence in the near future, can be corrected by rewriting the correct data to that memory location. Soft errors can also be related to noise in the memory system, or due to unstable DRAMs or SIMMs (DRAMs in the form of single inline memory modules).

Hard errors in the memory are repeatable errors which alter data due to some fault in the memory, and cannot be recovered by rewriting the correct data to the same memory location. Hard errors can occur when one memory cell becomes stuck in either state, or when SIMMs are not properly seated.

Silent failures are failures that cannot be detected by the system. For example, if a standby part fails inside a system having redundant parts, most systems will remain unaware of the failure. However, although the system is still functional, it has lost its redundancy as if the same had never been provided, and is now vulnerable to a single failure of the operating part. Soft errors and hard errors can be either be single bit or multiple bit memory errors, and can also be silent failures under certain conditions.

Currently, server systems manufactured and sold by Sun Microsystems, Inc., assignee of the present invention, are implemented with an error correction code (ECC) to protect the system from single bit memory errors. In the event of a single bit memory error in the data or the correction code as read from memory, the system automatically corrects the error before the data retrieved from memory is used. This is implemented using an 8-bit KANEDA error correction code for the 64-bit dataword of the memories, making the entire codeword 72-bits wide. The actual error detection and correction operation is done, for instance, by dedicated ECC circuitry as part of the processor module so that on the occurrence of a single bit memory error in the 72-bit codeword received from memory, the same will automatically be corrected before being presented to the processor. Also, upon the occurrence of a single bit error and the correction thereof by the ECC circuitry, the processor is alerted to that fact so that the processor will include the additional step of writing the corrected codeword (data and ECC) back to memory on the unverified assumption that the single bit error was a soft error. In such systems, the I/O of the system consists of a 64-bit word, the applicable ECC code being tacked onto any dataword before the resulting 72-bit codeword is written to memory.

Also, in the current systems of the type described, an automatic reset is initiated upon the occurrence of a double bit memory error. This, of course, results in an interruption of service by the system, loss of any ongoing communication, and loss of data. Because a double bit error is a rare event under normal operating conditions, such system failures caused by double bit memory errors are also rare. However, normal operating conditions may be defined as operation without excessive memory errors occurring in the system, wherein the ECC implementation described provides adequate protection for the integrity of the system memory. But two events can change a normal operating condition into an abnormal operating condition, specifically that (1) the memory subsystem has excessive single bit soft errors, and (2) the memory subsystem has single bit hard errors. These occurrences obviously greatly increase the probably that a normally expected soft error will become a second bit error causing automatic interruption of the system.

In the current ECC implementation, no memory error log is visible to the system administrator. Thus, whenever there is a single bit memory error, the system simply corrects it and continues to run. Under normal operating conditions, protecting the system from single bit errors is the purpose of the ECC. Under abnormal operating conditions, the ECC actually masks the underlying problem. When the memory subsystem has either excessive single bit soft errors or single bit hard errors, they become silent failures in the current ECC implementation. The system then becomes prone to single bit errors so that an additional single bit memory error combined with the silent failure may result in a double bit error, bringing the system down.

SUMMARY OF THE INVENTION

On-line memory monitoring system and methods wherein memory subsystem performance is tracked to detect substandard performance and alert a system administrator of the nature of the substandard performance so corrective action can be taken before a system crash and/or automatic reset occurs. A computer system incorporating the invention includes a memory and a processor, wherein the memory storage includes data storage and error correction code storage for each dataword. The system further includes automatic error detection and correction circuitry and software which monitors the occurrence of correction of errors and compares their frequency with the known frequency of soft errors for the memory devices being used to determine whether an alert is to be given and the nature of any such alert.

The on-line memory monitoring system uses a unique statistical inference method developed to calculate the probability of the occurrence of multiple bit memory errors based on the number of single bit memory errors and the frequency of their occurrence as observed by the system. Once the probability is above a predetermined threshold, the on-line memory monitoring system will provide the appropriate alert.

DETAILED DESCRIPTION OF THE INVENTION

Figure 1:
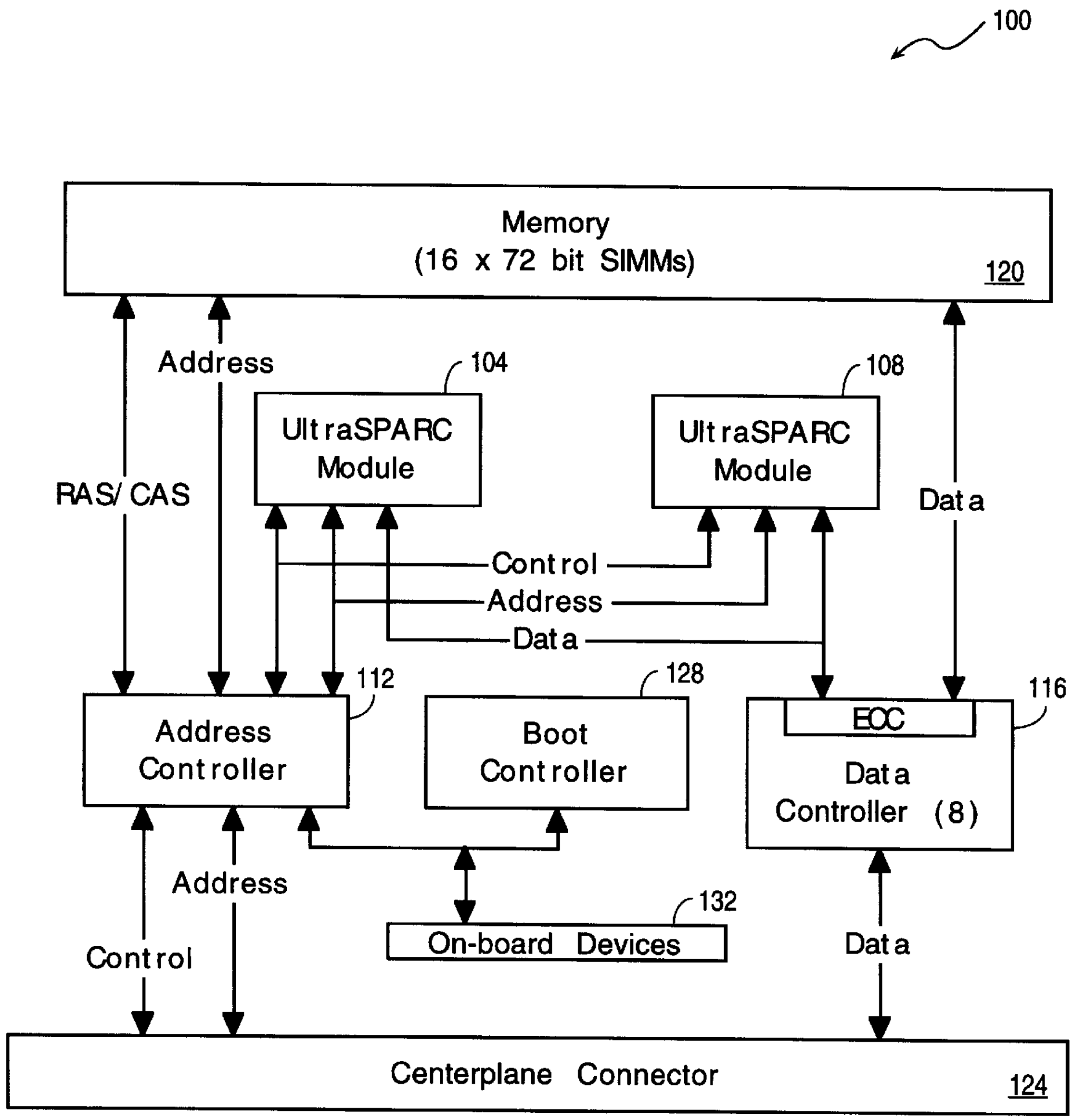
FIG. 1 is a block diagram of the internal structure of the CPU/memory board of a system which may incorporate the present invention.

First referring to FIG. 1, a block diagram of 100 the internal structure of the CPU/memory board for the Enterprise X000 server systems to be introduced by Sun Microsystems, Inc., assignee of the present invention. As may be seen therein, the CPU/memory board contains two UltraSPARC modules 104, 108 containing high performance superscalar 64-bit SPARC processors (not shown). These modules are coupled through address controllers 112 and data controllers 116 to memory 120 and to a centerplane connector 124 for connecting to a system bus structure (not shown). Also shown in FIG. 1 is a boot controller 128 and other on-board devices 132, their specific structure being well known and not important to the present invention.

As with the prior art systems of Sun Microsystems, Inc., the memory 120 is 72 bits wide, providing 64 bits of data and 8 bits of ECC. However in accordance with the present invention, continuous on-line monitoring of memory errors is provided. As soon as the memory 120 is found to have excessive single-bit soft errors relative to known statistics for such memories, or single-bit hard errors, a warning or alert may be presented to the system administrator so that corrective action can be taken. In the preferred embodiment, the on-line monitoring is done under software control, and continually monitors the system, logging all single-bit errors and the memory device in which such errors occurred. Upon the occurrence of another error, the on-line monitoring software analyzes the error log using statistical analysis to identify any abnormal operating condition that may be indicated. Since occasional memory errors are to be expected for dynamic random access memories (DRAMs), single-bit errors encountered in a properly operating system will be found to not indicate an abnormal operating condition, but once the rate of errors indicate an abnormal operating condition, the system administrator can be alerted to the condition and the memory device causing the problem.

An abnormal operating condition will be caused by either type of memory error, specifically excessive single-bit soft errors, or single-bit hard errors. From a system point of view, both types of errors are single-bit errors that occur at an excessive rate. The only difference between the two is that the hard errors can show up each time that part of the memory is accessed, while the soft errors may appear less frequently. This occurs because the hard errors are not correctable in memory by merely writing the corrected information back into memory. In that regard, note that a bad memory cell hung in one state may or may not show up on any read access thereto as a hard error. As an example, if an instruction, or fixed data, is stored at that location in memory, one will either get a single-bit error every time that location is accessed for reading if the cell is hung in the opposite state from the corresponding bit in the instruction or fixed data, or no error will be encountered when that location is accessed for reading if the cell is hung in the same state as the corresponding bit in the instruction or fixed data. On the other hand, if the location is used for storage of random or near random data, then the fault will result in a single-bit error about half the time new data therein is read.

Memory is made of DRAMs, for which the frequency and distribution of single-bit errors under normal operating conditions are known. If the detected DRAM single-bit errors far exceed what is expected under normal operating conditions, it can be concluded that the memory is having excessive single-bit errors. During normal operating conditions, only soft errors should occur in the DRAM, and then only within the reasonably expected frequency for such DRAMs. Single-bit soft errors occur in DRAMs in a Poisson distribution as follows:

$$P(x) = \frac{(\lambda t)^x}{x!} e^{-\lambda t} \qquad x = 0, 1, 2, \ldots$$

where:

- t=time
- x=the number of soft errors during a given time t
- λ=the mean number of soft errors during a given time t representative of the DRAMs used
- P(x)=the probability of encountering x soft errors in a given time t A Poisson distribution is a single parameter and discrete event distribution.

Based on previous testing, exemplary failure rates for certain DRAMs are set out in Table 1:

TABLE 1

Exemplary DRAM Failure Rates

| Memory Size | Memory Organization | Average Failure Rate |
|---|---|---|
| 1 Mb | 1M × 1 | 2,000 FIT* |
| 4 Mb | 1M × 4, 4M × 1 | 3,000 FIT |
| 16 Mb | 4M × 4 | 9,000 FIT |

*One FIT is one failure per $10^9$ hours of operation

Based on the foregoing formula and failure rates in Table 1, system's failure rate under normal operating conditions can be determined. The Table 2 shows the probability of having 0, 1, 2 and 3 or more failures per SIMM using 1 Mb DRAM.

TABLE 2

Probability Table of Single-Bit Soft Errors

| Time | Probability of having x number of soft errors over time per SIMM | | | |
|---|---|---|---|---|
| (days) | x = 0 | x = 1 | x = 2 | x ≧ 3 |
| 1 | 0.999136 | 0.000863 | 3.70E-07 | 1.07E-10 |
| 2 | 0.998273 | 0.001725 | 1.50E-06 | 8.59E-10 |
| 3 | 0.997411 | 0.002585 | 3.40E-06 | 2.90E-09 |
| 4 | 0.996550 | 0.003444 | 6.00E-06 | 6.86E-09 |
| 5 | 0.995689 | 0.004301 | 9.30E-06 | 1.34E-08 |
| 6 | 0.994829 | 0.005157 | 0.000013 | 2.31E-08 |
| 7 | 0.993970 | 0.006012 | 0.000018 | 3.67E-08 |
| 8 | 0.993112 | 0.006864 | 0.000024 | 5.48E-08 |
| 9 | 0.992254 | 0.007716 | 0.000030 | 7.79E-08 |
| 10 | 0.991397 | 0.008566 | 0.000037 | 1.07E-07 |

Once the DRAM's failure rate and failure distribution are determined, the on-line monitoring software can assess the system's operating condition based on the number of memory errors being detected. This can be accomplished by using a statistical analysis.

In accordance with the present invention, a statistical inference method is developed to determine whether the system is running under normal operating conditions. This statistical inference method establishes two hypotheses as follows:

1. $H_0$ means that the DRAM error rate is as listed in Table 1, indicating that the system is running under normal operating conditions.

2. $H_1$ means that the DRAM error rate is much higher than what is listed in Table 1, indicating that the system is running under abnormal operating conditions.

In this hypothesis test, the criteria for accepting $H_0$ or $H_1$ is based on the probability of the number of memory errors per SIMM that are observed during the test period. In the exemplary embodiment, if the probability is less than 0.0001 (0.01% chance of happening), an extremely unlikely event, the $H_0$ hypothesis is rejected and the alternative $H_1$ hypothesis is accepted. Rejecting $H_0$ means that the system, with very little doubt, is having excessive memory errors, and the system administrator should be alerted to take the necessary corrective steps. If the probability is higher than 0.0001, the event is considered to be a sufficiently likely event as to be within the statistics of normal operating conditions and the test continues. Obviously, the threshold between a sufficiently likely event to ignore and a sufficiently unlikely event to provide an alert may be altered as desired.

As stated before, the on-line monitoring is done by the processor under software control. Upon the detection of a single-bit error detected and corrected by the ECC circuitry, the processor will carry out the further steps of updating the error log, apply the hypothesis test to the error log information, notify the system administrator of the type and location of the problem if appropriate, and write the corrected data and ECC information back into the memory location from which the data and ECC in error was obtained. The corrected data and ECC is written back into memory on the unverified assumption that the error was a soft error correctable by writing good data (and associated ECC) over the bad data and ECC.

To simplify the implementation of the hypothesis test in the on-line monitoring software, the following exemplary set of steps may be used (no particular order of the steps is to be implied herein and in the claims unless and only to the extent a particular step requires the completion of another step before the particular step may itself be completed). The on-line software in this exemplary embodiment will log the memory errors for up to three test periods (time periods) as listed in Table 3. Each time a memory error occurs, the software checks to see if the number of memory errors observed during the three test periods has exceeded the number of memory errors allowed for each of those time periods.

TABLE 3

Decision Set of Rules

| DRAM Size | Test Period 1 | # of Errors Allowed per SIMM | Test Period 2 | # of Errors Allowed per SIMM | Test Period 3 | # of Errors Allowed per SIMM |
|---|---|---|---|---|---|---|
| 1 Mb | 2 hrs | 1 | 16 days | 1 | 30 days | 2 |
| 4 Mb | 2 hrs | 1 | 11 days | 1 | 30 days | 2 |
| 16 Mb | 2 hrs | 1 | 4 days | 1 | 22 days | 2 |

If the number of observed errors does not exceed the allowed number of errors during all three test periods, the process will continue with no alert being given. If the number of allowable errors is exceeded for any of the time periods, the system administrator will be alerted by the processor. Based on the severity of the problem, preferably one of two levels of alarms are sent to the system administrator: a Red Flag indicating immediate action required, or a Yellow Flag indicating action required, but suggesting a less urgent requirement, as set out in Table 4 below:

TABLE 4

Alarm Levels

| | Time During Which the Error is Observed | | |
|---|---|---|---|
| | Test Period 1 | Test Period 2 | Test Period 3 |
| Alarm Level | Red Flag | Yellow Flag | Yellow Flag |

Assuming SIMM type memory components are being used, and since excessive single-bit memory errors can be caused by either a bad SIMM or an improperly seated SIMM, on an alert it may be preferable to first try to re-seat the SIMMs to see if the abnormal error condition repeats before replacing the SIMM.

Figure 2:
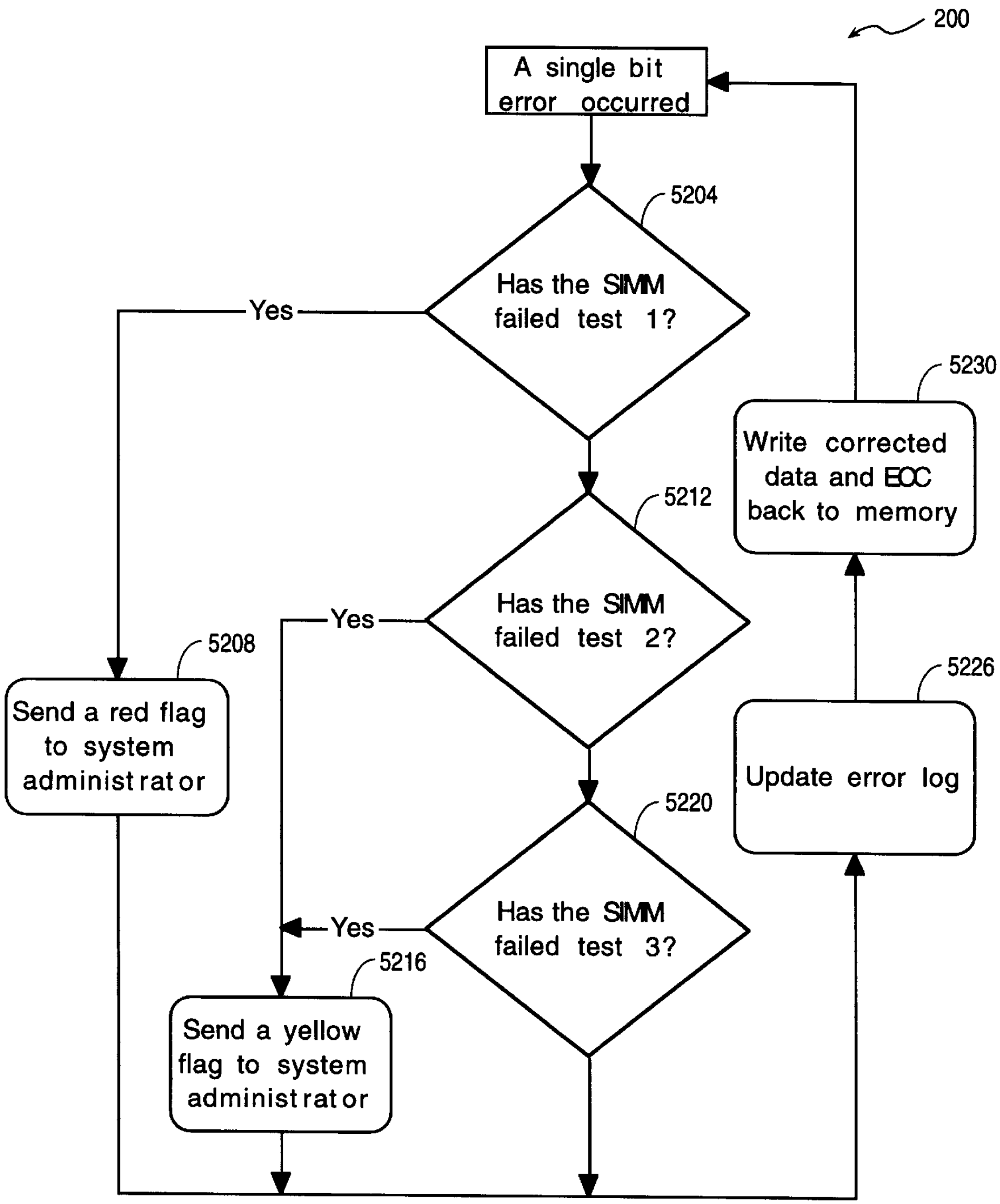
FIG. 2 is a logic flow diagram for the operation of the on-line memory monitoring system.

Now referring to FIG. 2, a logic flow diagram 200 for the operation of the preferred embodiment of the on-line memory monitoring system of the present invention may be seen. Whenever the ECC circuitry detects a single bit error, the on-line memory monitoring analysis is initiated. The first test is to check the error log to determine if the same SIMM has given a single bit error in the last two hours in step S204. In the preferred embodiment, the error is maintained as a running log, maintaining the log of the time the error occurred and the SIMM for which it occurred for all single bit errors for the longest test period used. For the 1 Mb and the 4 Mb devices of Table 3, the log would be maintained to cover the last 30 days. For the 16 Mb devices, the error log would be maintained to cover the last 22 days.

Returning again to FIG. 2, if the current single bit error was from a SIMM which gave a single bit error within the last two hours (test 1 of Table 3), a red flag is sent to the system administrator is step S208, indicating a most serious condition caused either by one or more hard errors, or at least an extraordinarily high rate of soft errors.

If the SIMM had not failed in the last two hours, a second test is made in step S212 to see if the SIMM has failed within the time of test period 2 of Table 3, which in the exemplary embodiment will vary dependent upon the DRAM size in question. If there has been another soft error within that time period, a yellow flag is sent to the system administrator in step S216, indicating a less serious condition than a red flag, but still indicating single bit errors have occurred at a statistically very unlikely rate.

Finally, if there has been no other soft error for that SIMM during test period 2, a check is made to see if two prior single bit errors have occurred during the immediately prior test period in step S220 of Table 2. Here too, if two such soft errors have occurred, a yellow flag is sent to the system administrator in step S216 so indicating. In any event, on completion of these tests, successful or not, the error log for the SIMM giving the single bit error will be updated in step S226, and sometime during this entire process the corrected data and ECC will be written back to memory in step S230 on the unverified assumption that the error was a soft error and thus correctable by so doing. Obviously, one could vary the foregoing tests and test periods as desired and/or as appropriate for DRAMs of different soft error rates, the numbers specifically disclosed herein for a preferred embodiment and the number of tests conducted being only exemplary of a particular embodiment of the invention.

Thus the on-line memory monitoring system uses a unique statistical inference method previously described to calculate the probability of the occurrence of multiple bit memory errors based on the number of single bit memory errors and the frequency of their occurrence as observed by the system. Once the probability is above one or more predetermined probabilities, the on-line memory monitoring system will provide the appropriate alert.

Figure 3:
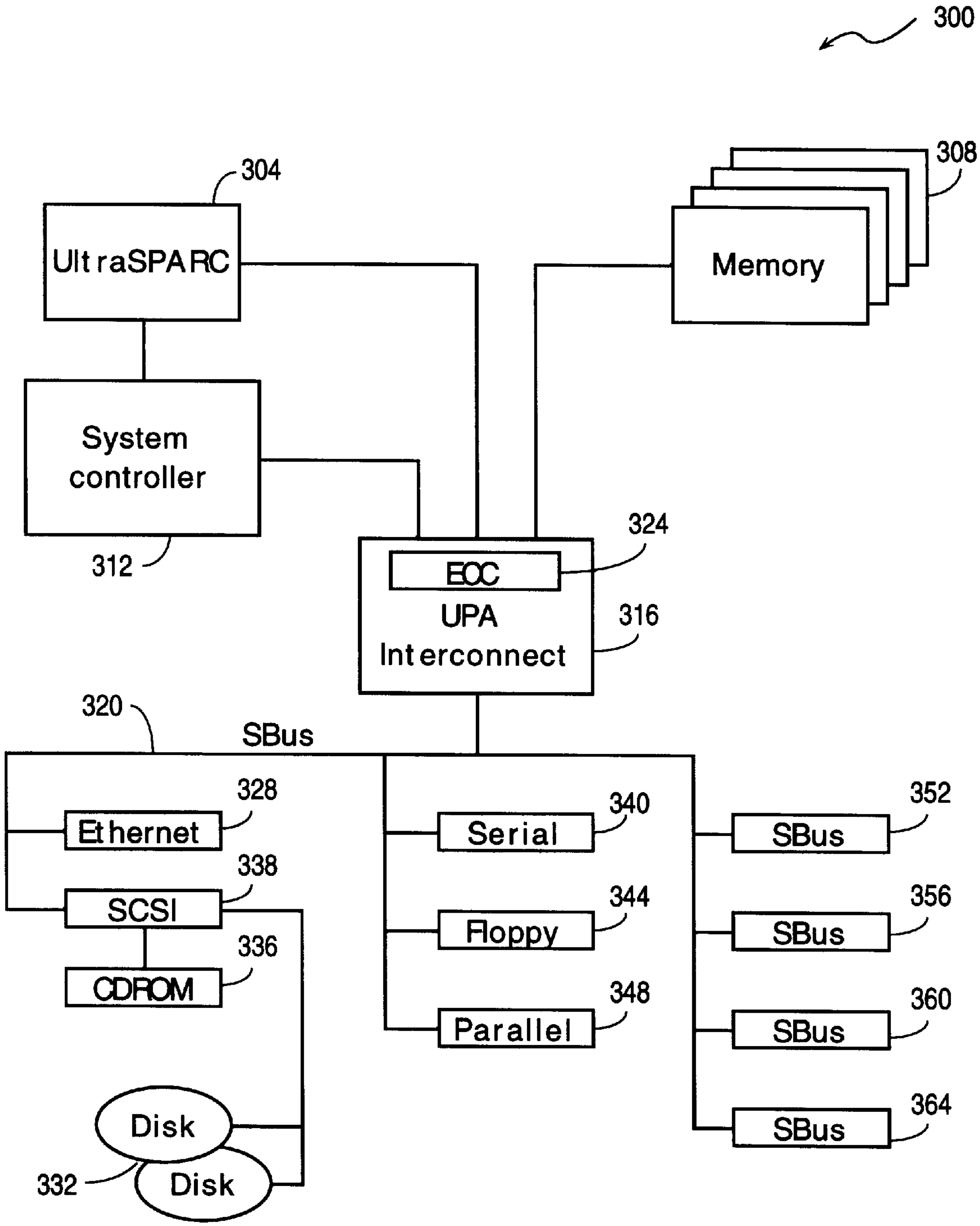
FIG. 3 illustrates a typical system that may use the present invention.

A typical system 300 that may use the present invention may be seen in FIG. 3. Here an UltraSPARC processor (CPU) 304, read/write random access memory 308 and system controller 312 are connected through a UPA Interconnect 316 to the SBus 320 to which various peripherals, communication connections and further bus connections are connected. The UPA (Ultra Port Architecture) Interconnect is a cache-coherent, processor-memory interconnect, the precise details of which are not important to the present invention. In the system shown, the error detection and correction circuitry 324 is within the UPA Interconnect (though the ECC circuitry could be elsewhere in the data path to and from the memory, or for that matter the ECC function could be done in software, though this is not preferred because of speed considerations). The UPA Interconnect 316 couples the CPU/memory 308 in the system shown in FIG. 3 to an Ethernet connection 228, and hard disk drives 332 and a CDROM 336 through a SCSI port 340. It also couples the CPU/memory 308 to a serial port 338, a floppy disk drive 344 and a parallel port 348, as well as a number of SBus connectors 302, 356, 360, 364 to which other SBus compatible devices may be connected.

The software program for carrying out the operations of the flow chart of FIG. 2 normally resides on one of the disk drives 332 in the system 300. On booting (turn-on) of the system, part of the code is loaded through the UPA Interconnect 316 into the memory 308. This code causes the CPU to respond to the occurrence of a single bit error, as flagged and corrected by the ECC circuitry 324, by calling the rest of the on-line memory monitoring program code into memory 308 and to execute the same to update the error log and to provide the appropriate warning flag to the system administrator.

While a preferred embodiment of the present invention has been disclosed and described herein, it will be obvious to those skilled in the art that various changes in form and detail may be made therein without departing from the spirit and scope of the invention.

What is claimed is:

1. A method of improving memory reliability in a computer comprising:

(a) providing an error correction code with data stored in memory;

(b) detecting and correcting memory errors in random access memory as they occur using the error correction code;

(c) updating an error log upon the detection and correction of each memory error;

(d) determining a rate at which the memory errors have occurred over a first elapsed time and at which memory errors have occurred over a second elapsed time longer than the first elapsed time; and, (e) providing a warning when the rate at which memory errors have occurred over either the first or the second time periods exceeds first and second predetermined memory error rate limits, respectively.

2. The method of claim 1 wherein step (e) comprises the step of providing a warning indicative of a memory failure if the rate at which memory errors have occurred over the first time period exceeds the first predetermined memory error rate limit, and of providing a warning indicative of an unusually high error rate if the rate at which memory errors have occurred over the second time period exceeds the second predetermined error rate limit.

3. The method of claim 1 wherein the memory errors are single bit memory errors.

4. The method of claim 3 further comprising resetting the computer on the detection of a double bit memory error.

5. The method of claim 1 wherein the memory is a dynamic random access memory.

6. The method of claim 1 further comprising:

correcting a memory error in data and its error correction code, as read from a memory location, using the error correction code, and writing the corrected data and error correction code back into the same memory location from which it was read.

7. A method of improving memory reliability in a system having a processing unit and dynamic random access memory (DRAM) comprising:

(a) providing an error correction code with data stored in memory;

(b) detecting and correcting, using the error correction code, single bit memory errors in data and its error correction code as read from memory;

(c) using the corrected data as error free data;

(d) writing the corrected data and error correction code back into the same memory location from which it was read;

(e) determining the rate at which the memory errors have occurred;

(f) providing a warning if the rate at which memory errors have occurred exceeds a predetermined limit, the predetermined limit based on a probability of multiple bit errors computed using a statistical inference from the rate at which single bit memory errors have occurred.

8. The method of claim 7 wherein the determining of the rate includes determining the rate at which memory errors have occurred over a first elapsed time and a second rate at which memory errors have occurred over a second elapsed time longer than the first elapsed time, and the providing of the warning includes providing a warning if the rate at which memory errors have occurred over either the first or the second time periods exceeds first and second predetermined memory error rate limits, respectively.

9. The method of claim 8 wherein the providing of the warning includes providing a warning indicative of a memory failure if the rate at which memory errors have occurred over the first time period exceeds the first predetermined memory error rate limit, and of providing a warning indicative of an unusually high error rate if the rate at which memory errors have occurred over the second time period exceeds the second predetermined error rate limit.

10. The method of claim 7 further comprising resetting the computer on the detection of a double bit memory error.

11. A method of improving memory reliability in a computer comprising:

(a) providing an error correction code with data stored in memory;

(b) detecting and correcting single bit memory errors as they occur using the error correction code;

(c) determining the probability of multiple bit errors using a statistical inference from the rate of single bit errors; and, (d) providing a warning if the probability of multiple bit errors exceeds an acceptable limit.

12. On-line memory monitoring apparatus comprising:

a processor;

a read/write random access memory coupled to the processor, the random access memory configured to store data words and associated error correction codes;

error detection and correction circuitry coupled to the read/write random access memory, the error detection and correction circuitry configured to determine the specific error correction code to be written to the memory with each data word to be written to memory, and to detect and correct certain errors in data and associated error correction codes as read from memory; and, an error monitor configured to respond to the error detection and correction circuitry to generate a log of detected errors and to provide a warning if the rate at which memory errors have occurred exceeds a predetermined limit the predetermined limit based on a probability of multiple bit errors computed using a statistical inference from the rate at which single bit memory errors have occurred.

13. The apparatus of claim 12 wherein the processor is configured to write the corrected data and associated error correction code back into the memory at the memory location from which it was read upon detection and correction of an error in data and associated error correction code read from the memory.

14. The apparatus of claim 13 wherein the error monitor is configured to respond to the error detection and correction circuitry to provide a warning if the rate at which memory errors have occurred over either a first or a second time period exceeds first and second predetermined memory error rate limits, respectively.

15. The apparatus of claim 14 wherein the error monitor is configured to provide a warning indicative of a memory failure if the rate at which memory errors have occurred over the first time period exceeds the first predetermined memory error rate limit, and of providing a warning indicative of an unusually high error rate if the rate at which memory errors have occurred over the second time period exceeds the second predetermined error rate limit.

16. The apparatus of claim 13 wherein the error detection and correction circuitry is configured to correct single bit errors and to at least detect double bit errors.

17. The apparatus of claim 16 wherein the error detection and correction circuitry is configured to provide a reset signal on the detection of a double bit memory error.

18. A computer system including:

a CPU/memory board having at least one bus connector for connecting to a system bus, the circuit board having thereon:

a processor coupled to the bus connector;

a read/write random access memory coupled to the processor, the random access memory configured to store data words and associated error correction codes;

error detection and correction circuitry coupled to the read/write random access memory, the error detection and correction circuitry configured to determine the specific error correction code to be written to the memory with each data word to be written to memory, and to detect and correct certain errors in data and associated error correction codes as read from memory;

the processor being configured to write the corrected data and associated error correction code back into the memory at the memory location from which it was read upon detection and correction of an error in data and associated error correction code read from the memory; and, an error monitor configured to respond to the error detection and correction circuitry to maintain a log of corrected errors and to provide a warning if the rate at which memory errors have occurred exceeds a predetermined limit.

19. The computer system of claim 18 wherein the error monitor is configured to respond to the error detection and correction circuitry to provide a warning if the rate at which memory errors have occurred over either a first or a second time period exceeds first and second predetermined memory error rate limits, respectively.

20. The computer system of claim 19 wherein the error monitor is configured to provide a warning indicative of a memory failure if the rate at which memory errors have occurred over the first time period exceeds the first predetermined memory error rate limit, and of providing a warning indicative of an unusually high error rate if the rate at which memory errors have occurred over the second time period exceeds the second predetermined error rate limit.

21. The computer system of claim 18 wherein the error detection and correction circuitry is configured to correct single bit errors and to at least detect double bit errors.

22. The computer system of claim 21 wherein the error detection and correction circuitry is configured to reset the computer system on the detection of a double bit memory error.

23. A system for on-line memory monitoring responsive to the detection and correction of a memory error, the system including code configured for storage on a computer-readable apparatus and executable by a computer, the code including a plurality of modules, the system including:

a first module configured to maintain a memory error log;

a second module configured to respond to the detection and correction of a memory error to determine using the memory error log if the rate at which memory errors have occurred exceeds a predetermined limit;

a third module logically coupled to the second module and configured to provide a warning if the second module determines that the rate at which memory errors have occurred exceeds a predetermined limit; and, a fourth module logically coupled to the first module and configured to update the error log upon the detection and correction of a memory error.

24. The system of claim 23 further comprising a fifth module configured to overwrite the memory after detection and correction of a memory error.

25. The system of claim 23 wherein the second module is configured to respond to the detection and correction of a memory error to determine using the memory error log if the rate at which memory errors have occurred exceeds a first or a second predetermined limit and the third module is configured to provide a warning of a first character if the second module determines that the rate at which memory errors have occurred exceeds the first predetermined limit, and further comprising a fifth module configured to provide a warning of a second character if the second module determines that the rate at which memory errors have occurred exceeds the second predetermined limit.

26. A method of improving memory reliability in a computer, comprising:

(a) providing an error correction code with data stored in memory;

(b) detecting and correcting memory errors as they occur using the error correction code;

(c) determining the number of memory errors which have occurred during a first time period and during a second time period longer than the first time period;

(d) providing a warning if the number of memory errors which have occurred during the first time period exceeds a first predetermined limit; and (e) providing the warning if the number of memory errors which have occurred during the second time period exceeds a second predetermined limit.

* * * * *